(12) United States Patent
Zhao

(10) Patent No.: US 10,885,321 B2
(45) Date of Patent: Jan. 5, 2021

(54) HAND DETECTION METHOD AND SYSTEM, IMAGE DETECTION METHOD AND SYSTEM, HAND SEGMENTATION METHOD, STORAGE MEDIUM, AND DEVICE

(71) Applicant: BOE TECHNOLOGY GROUP CO., LTD., Beijing (CN)

(72) Inventor: Jibo Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 61 days.

(21) Appl. No.: 16/342,626

(22) PCT Filed: Jun. 14, 2018

(86) PCT No.: PCT/CN2018/091321
§ 371 (c)(1),
(2) Date: Apr. 17, 2019

(87) PCT Pub. No.: WO2019/041967
PCT Pub. Date: Mar. 7, 2019

(65) Prior Publication Data
US 2019/0236345 A1    Aug. 1, 2019

(30) Foreign Application Priority Data
Aug. 31, 2017 (CN) .......................... 2017 1 0771527

(51) Int. Cl.
*G06T 7/187* (2017.01)
*G06K 9/00* (2006.01)
(Continued)

(52) U.S. Cl.
CPC .......... *G06K 9/00355* (2013.01); *G06F 3/011* (2013.01); *G06F 3/017* (2013.01);
(Continued)

(58) Field of Classification Search
CPC combination set(s) only.
See application file for complete search history.

(56) References Cited

U.S. PATENT DOCUMENTS

| 6,088,512 | A | * | 7/2000 | Ancin | G09G 3/3611 |
|---|---|---|---|---|---|
| | | | | | 358/1.9 |
| 9,436,872 | B2 | * | 9/2016 | Tang | G06K 9/00382 |

(Continued)

FOREIGN PATENT DOCUMENTS

| CN | 102750690 | A | | 10/2012 | |
|---|---|---|---|---|---|
| CN | 103996019 | A | | 8/2014 | |
| CN | 109426789 | A | * | 3/2019 | ......... G06K 9/00355 |

OTHER PUBLICATIONS

First Office Action dated Mar. 24, 2020 by the Chinese Patent Office in the priority Chinese application No. 201710771527.8 and its English translation.

*Primary Examiner* — Tsung Yin Tsai
(74) *Attorney, Agent, or Firm* — Dilworth & Barrese, LLP.; Michael J. Musella, Esq.

(57) ABSTRACT

A hand detection method, a hand segmentation method, an image detection method and system, a storage medium, and a device are provided. The image detection method includes: determining a first starting point in a connected domain of an image to be detected; determining n farthest extremum points different from the first starting point, wherein an Nth farthest extremum point is a pixel point in the connected domain having a maximum geodesic distance to an Nth starting point, an (N+1)th starting point is the Nth farthest extremum point, and n and N are both positive integers; performing region growing with the n farthest extremum points as initial points respectively, to acquire n regions in the connected domain; judging whether a relationship between a preset feature of each region and a preset feature of the connected domain satisfies a selection condition, to
(Continued)

determine an available region satisfying the selection condition.

20 Claims, 7 Drawing Sheets

(51) Int. Cl.
*G06F 3/01* (2006.01)
*G06F 3/03* (2006.01)

(52) U.S. Cl.
CPC ............. *G06F 3/0304* (2013.01); *G06K 9/00* (2013.01); *G06T 7/187* (2017.01)

(56) References Cited

U.S. PATENT DOCUMENTS

| | | | |
|---|---|---|---|
| 10,311,295 B2* | 6/2019 | Tang | G06K 9/00201 |
| 10,650,523 B2* | 5/2020 | Zhao | G06T 7/73 |
| 2015/0104106 A1* | 4/2015 | Elinas | G06K 9/48 |
| | | | 382/201 |
| 2015/0326845 A1* | 11/2015 | Liang | G06T 7/174 |
| | | | 382/154 |

* cited by examiner (A)　　　(B)

HAND DETECTION METHOD AND SYSTEM, IMAGE DETECTION METHOD AND SYSTEM, HAND SEGMENTATION METHOD, STORAGE MEDIUM, AND DEVICE

This application claims the benefit of Chinese patent application No. 201710771527.8 filed on Aug. 31, 2017, which is hereby entirely incorporated by reference as a part of the present application.

TECHNICAL FIELD

Embodiments of the present disclosure relate to a hand detection method, a hand segmentation method, an image detection method, an image detector system, a storage medium, and a device including the image detector system or the storage medium.

BACKGROUND

With the development of human-computer interaction technology, computer vision-based gesture recognition technology has become one of the research hotspots in the human-computer interaction technology due to the advantage of enabling human-computer interaction in a natural way.

Hand detection is the basis of the gesture recognition technology. The hand detection refers to marking the hand in a video file or a static picture. In the hand detection, fingertip information can be extracted or hand segmentation can be performed.

SUMMARY

Embodiments of the present disclosure relate to a hand detection method, a hand segmentation method, an image detection method, an image detector system, a storage medium, and a device including the image detector system or the storage medium.

At least one embodiment of the present disclosure provides an image detection method, which includes: determining a first starting point in a connected domain in an image to be detected; determining n farthest extremum points that are different from the first starting point and are in the connected domain in the image to be detected, in which an Nth farthest extremum point among the n farthest extremum points is a pixel point which is in the connected domain and which has a maximum geodesic distance from an Nth starting point, an (N+1)th starting point is the Nth farthest extremum point, both n and N are positive integers, and N≤n; performing region growing by respectively taking the n farthest extremum points as initial points, so as to acquire n regions in the connected domain; and determining an available region that satisfies a selection condition by determining whether a relationship between a preset feature of each region among the n regions and a preset feature of the connected domain satisfy the selection condition.

For example, a distance from an object point corresponding to the first starting point to an object point corresponding to one of a gravity center of the connected domain in the image to be detected and a geometric center of a circumscribed graph of the connected domain is smaller than 2 centimeters.

For example, the method further includes: acquiring a coordinate of the farthest extremum point that is included by the available region.

For example, the method further includes: determining a data change direction of the connected domain by a principal component analysis method, and acquiring a target image by segmenting the connected domain according to a first reference length along the data change direction; the first reference length is the product of a first predetermined multiple and a size of the available region.

For example, the data change direction of the connected domain is a principal direction of the connected domain.

For example, the method is used for hand detection.

For example, the first predetermined multiple is 1.5 to 1.7.

For example, in a situation where the n regions include a plurality of available regions, the first reference length is the product of the first predetermined multiple and a size of the available region with a maximum length among the plurality of available regions.

For example, the selection condition of the available region includes at least one of A, B or C; A: a first ratio of a length of each region to a maximum width of the connected domain is not smaller than ⅓ and not greater than 1.5; B: a second ratio of a width of each region to a maximum width of the connected domain is not greater than ⅕; and C: a third ratio of an area of each region to an area of the connected domain is not greater than ⅕.

For example, before the determining the first starting point, the method further includes: acquiring a second image that includes an initial connected domain from a first image according to a color range; and acquiring the connected domain in the image to be detected by processing the initial connected domain of the second image.

For example, the method is used for hand detection, and the acquiring the connected domain by processing the initial connected domain includes: adopting a principal component analysis method to determine a data change direction of the initial connected domain; making a preset coordinate axis of a coordinate system of the second image parallel to the data change direction of the initial connected domain; for each position among a plurality of positions of the preset coordinate axis, calculating the number of pixel points that are corresponding to each position and are in the initial connected domain; selecting the number of the pixel points that is maximum to serve as a reference number, and taking the product of the reference number and a second predetermined multiple as a second reference length; and acquiring the connected domain in the image to be detected by segmenting the initial connected domain according to the second reference length along the data change direction of the initial connected domain.

For example, the second predetermined multiple is greater than or equal to 2.5 and smaller than or equal to 3.

For example, for each region among the n regions, a determination method of a growth end point of the region includes: after the ith growth of the region, in a situation where an increased value of the number of pixel points in the (i+1)th growth of the region exceeds a preset value, the ith growth is the last growth of the region.

For example, for each region among the n regions, a growth end point of the region is determined according to a preset length.

For example, the image to be detected does not include depth information of pixel points.

At least one embodiment of the present disclosure further provides an image detector system, which includes a processor, a memory and computer program instructions stored in the memory, the computer program instructions are executed by the processor to perform: determining a first starting point in a connected domain in an image to be detected; determining n farthest extremum points that are different from the first starting point and are in the connected domain in the image to be detected, in which an Nth farthest extremum point among the n farthest extremum points is a pixel point which is in the connected domain and which has a maximum geodesic distance from an Nth starting point, an (N+1)th starting point is the Nth farthest extremum point, both n and N are positive integers, and N≤n; performing region growing by respectively taking the n farthest extremum points as initial points, so as to acquire n regions in the connected domain; and determining an available region that satisfies a selection condition by determining whether a relationship between a preset feature of each region among the n regions and a preset feature of the connected domain satisfy the selection condition.

For example, a distance from an object point corresponding to the first starting point to an object point corresponding to one of a gravity center of the connected domain in the image to be detected and a geometric center of a circumscribed graph of the connected domain is smaller than 2 centimeters.

At least one embodiment of the present disclosure further provides an image detector system, which includes: a point determiner device configured to determine a first starting point and n farthest extremum points different from the first starting point in a connected domain in an image to be detected, in which an (N+1)th starting point is an Nth farthest extremum point among the n farthest extremum points, the Nth farthest extremum point is a pixel point which is in the connected domain and which has a maximum geodesic distance from an Nth starting point, both n and N are positive integers, and N≤n; a region determiner device configured to perform region growing by respectively taking the n farthest extremum points as initial points, so as to acquire n regions in the connected domain; and a judge device configured to determine an available region that satisfies a selection condition by determining whether a relationship between a preset feature of each region among the n regions and a preset feature of the connected domain satisfy the selection condition.

For example, a distance from an object point corresponding to the first starting point to an object point corresponding to one of a gravity center of the connected domain in the image to be detected and a geometric center of a circumscribed graph of the connected domain is smaller than 2 centimeters.

For example, the image detector system further includes an extractor device which is configured to: acquire a coordinate of the farthest extremum point that is included by the available region; or determine a data change direction of the connected domain by a principal component analysis method, and acquire a target image by segmenting the connected domain according to a reference length along the data change direction, in which the reference length is the product of a size of the available region and a predetermined multiple.

At least one embodiment of the present disclosure further provides a storage medium, computer program instructions are stored in the storage medium and applicable to be loaded by a processor to execute following operations: determining a first starting point in a connected domain in an image to be detected; determining n farthest extremum points that are different from the first starting point and are in the connected domain in the image to be detected, in which an Nth farthest extremum point among the n farthest extremum points is a pixel point which is in the connected domain and which has a maximum geodesic distance from an Nth starting point, an (N+1)th starting point is the Nth farthest extremum point, both n and N are positive integers, and N≤n; performing region growing by respectively taking the n farthest extremum points as initial points, so as to acquire n regions in the connected domain; and determining an available region that satisfies a selection condition by determining whether a relationship between a preset feature of each region among the n regions and a preset feature of the connected domain satisfy the selection condition.

For example, a distance from an object point corresponding to the first starting point to an object point corresponding to one of a gravity center of the connected domain in the image to be detected and a geometric center of a circumscribed graph of the connected domain is smaller than 2 centimeters.

At least one embodiment of the present disclosure further provides a device, which includes the image detector system according to any one of the above embodiments or the storage medium described above.

At least one embodiment of the present disclosure further provides a hand detection method using the image detection method which includes: determining a position of a palm of a hand in the connected domain in the image to be detected, and taking the position of the palm of the hand as the first starting point; determining the n farthest extremum points different from the position of the palm of the hand, in which the Nth farthest extremum point is the pixel point which is in the connected domain and has the maximum geodesic distance from the Nth starting point, the (N+1)th starting point is the Nth farthest extremum point, and both n and N are positive integers; performing the region growing by respectively taking the n farthest extremum points as initial points, so as to acquire n regions in the connected domain; and determining an available finger region that satisfies the selection condition by determining whether the relationship between the preset feature of each region among the n regions and the preset feature of the connected domain satisfy the selection condition.

At least one embodiment of the present disclosure further provides a hand segmentation method, which includes: acquiring a skin color connected domain by skin color detection; acquiring both a principal direction based on a principal component analysis method and a maximum width of the skin color connected domain, and acquiring a suspected hand connected domain by segmenting the skin color connected domain according to a predetermined multiple of the maximum width along the principal direction; and determining whether the suspected hand connected domain includes the available finger region by the above hand detection method.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 9:
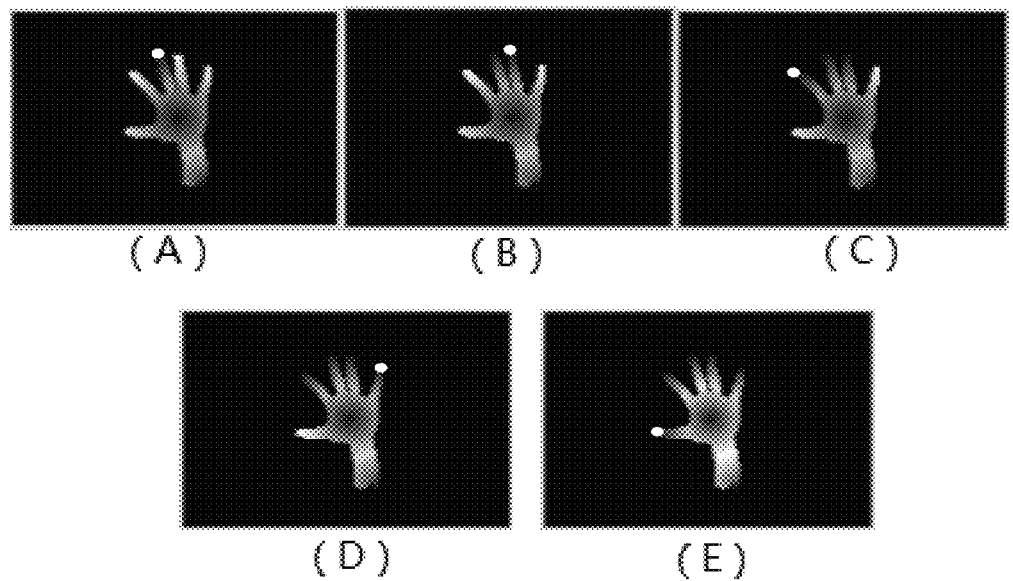
Figure 10:
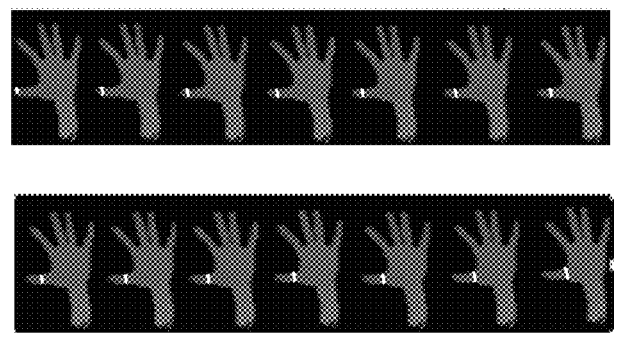
Figure 11:
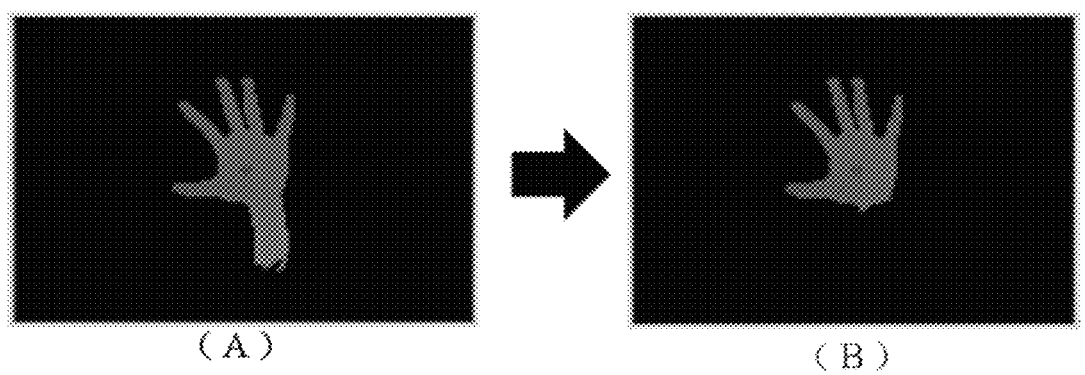
Figure 12:
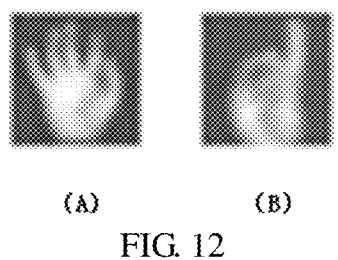
Figure 13:
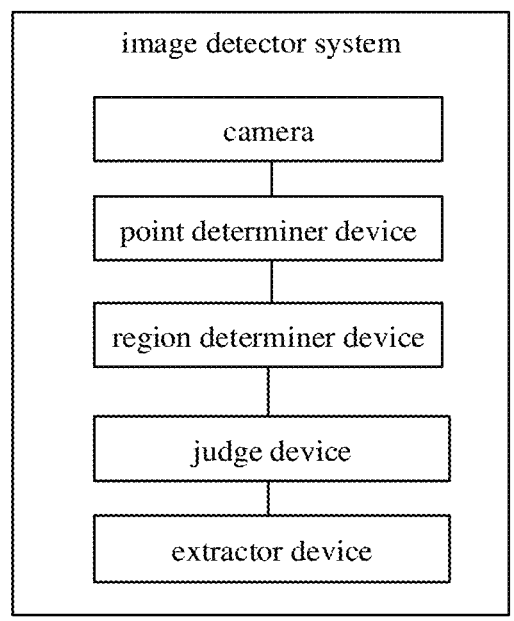
Figure 14:
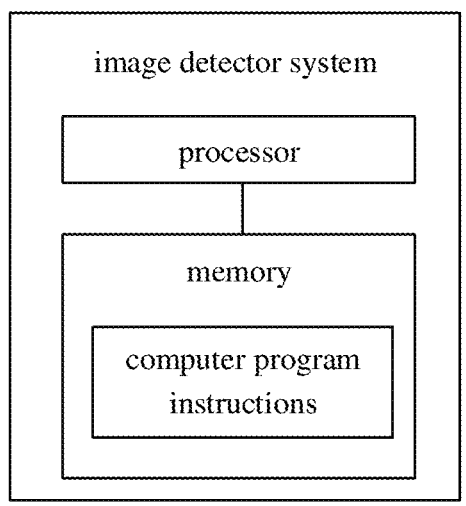
Figure 15:
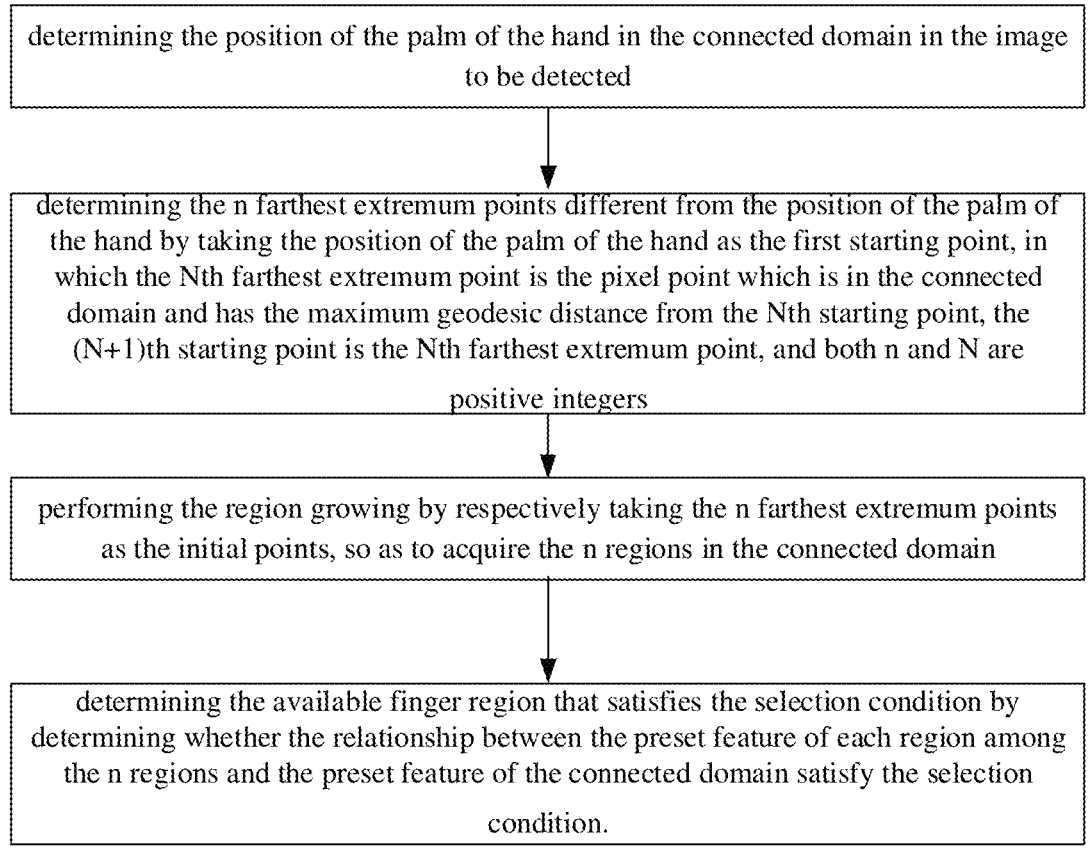
Figure 16:
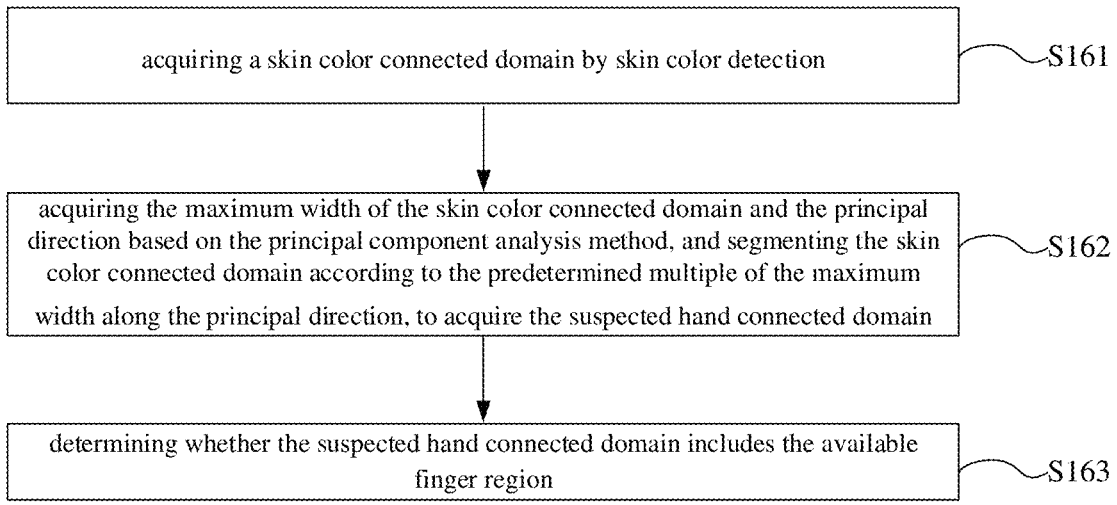

(A) to (E) in FIG. 9 are schematic diagrams of farthest extremum points detected in the image detection method provided by the embodiments of the present disclosure;

FIG. 10 is a schematic diagram illustrating region growing in the image detection method provided by the embodiments of the present disclosure;

(A) and (B) in FIG. 11 are comparison diagrams before and after the process of segmenting a connected domain according to the available finger region in the image detection method provided by the embodiments of the present disclosure;

(A) and (B) in FIG. 12 are hand images obtained by the image detection method provided by the embodiments of the present disclosure;

FIG. 13 is a structural block diagram of an image detector system provided by the embodiments of the present disclosure;

FIG. 14 is a structural block diagram of another image detector system provided by the embodiments of the present disclosure;

FIG. 15 is a flowchart of a hand detection method provided by the embodiments of the present disclosure; and FIG. 16 is a flowchart of a hand segmentation method provided by the embodiments of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide an image detection method, an image detector system, a storage medium, a device including the image detector system or a storage medium, a hand detection method, and a hand segmentation method.

The general concept of the embodiments of the present disclosure is that: for a connected domain in an image to be detected, determining the first starting point and determining at least one farthest extremum point, for instance, n farthest extremum points, according to the first starting point, in which the Nth farthest extremum point among the n farthest extremum points is a pixel point which is in the connected domain and which has the maximum geodesic distance to the Nth starting point, the (N+1)th starting point is the Nth farthest extremum point (the Nth farthest extremum point is obtained according to the Nth starting point, and the obtained Nth farthest extremum point is taken as the (N+1)th starting point; and so on), both n and N are positive integers, and N≤n; performing region growing by taking the at least one farthest extremum point as an initial point, so as to obtain at least one region (hereafter referred to as a suspected region); detecting whether the at least one region satisfies a selection condition; and if an available region satisfying the selection condition is obtained, utilizing the available region to extract required information or perform subsequent analysis.

In the embodiments of the present disclosure, the suspected region obtained by performing the region growing by taking the farthest extremum point as the initial point may be a region where a part of a target object is located, and the process of obtaining the suspected region by means of the region growing can avoid the interference of a region which is in the image to be detected, is connected with the connected domain of the target object but is actually corresponding to an interferent; the process of determining the available region by detecting the suspected region according to the preset selection condition can further eliminate the interference region in the image to be detected; and because the available region satisfies the selection condition, it can be considered that the available region is the region where the part of the target object is located, and by setting the selection condition, the interference factors of image detection can be further reduced, and then the accuracy of the image detection result can be improved. The image detection technology provided by the embodiments of the present disclosure can effectively reduce the interference factors and then realize rapid real-time calculation.

For instance, the embodiments of the present disclosure can be used for hand detection in image recognition, namely used for the detection of the hand from an image. For instance, the embodiments of the present disclosure are used for fingertip detection or hand segmentation (namely extracting a hand image from the image) in hand detection. In this case, an actual object corresponding to the connected domain in the image to be detected may include the hand, and the connected domain in the image to be detected is hereafter referred to as a suspected hand connected domain;

the first starting point may be a position of the palm of the hand (also referred to as a central region of the hand); the farthest extremum point may be a position where the fingertip of the finger is located, and hereafter be referred to as a suspected fingertip of the finger; the region obtained by performing the region growing by taking the farthest extremum point as the initial point may be the region where the finger is located (hereafter referred to as a suspected finger region); the available region satisfying the selection condition is regarded as a region where the finger is located, and is hereafter referred to as an available finger region; the selection condition is determined according to the morphological feature of the hand, and the morphological feature, for instance, refers to a relationship between a size (e.g., length, width or area) of the finger and a size of the hand.

Given that the available region is considered as the region where the finger is located, when the embodiments of the present disclosure are used for fingertip detection, the farthest extremum point in the available region can be taken as the fingertip, and a coordinate of the fingertip is acquired by acquisition of a coordinate of the farthest extremum point.

As a matter of experience, the length of the hand is about 1.5 times the length of the finger. Therefore, when the embodiments of the present disclosure are used for hand segmentation in image recognition, the connected domain can be segmented according to the size of the available region by utilization of the relationship between the length of the hand and the length of the finger, so as to remove a region where an object, except the hand, in the connected domain is located, and then acquire a target image (namely a hand image).

Detailed description will be given below to the hand detection method, the image detection method, the hand segmentation method, the image detector system, the storage medium, and the device including the image detector system or the storage medium, provided by the embodiments of the present disclosure, with reference to the accompanying drawings.

Figure 1:
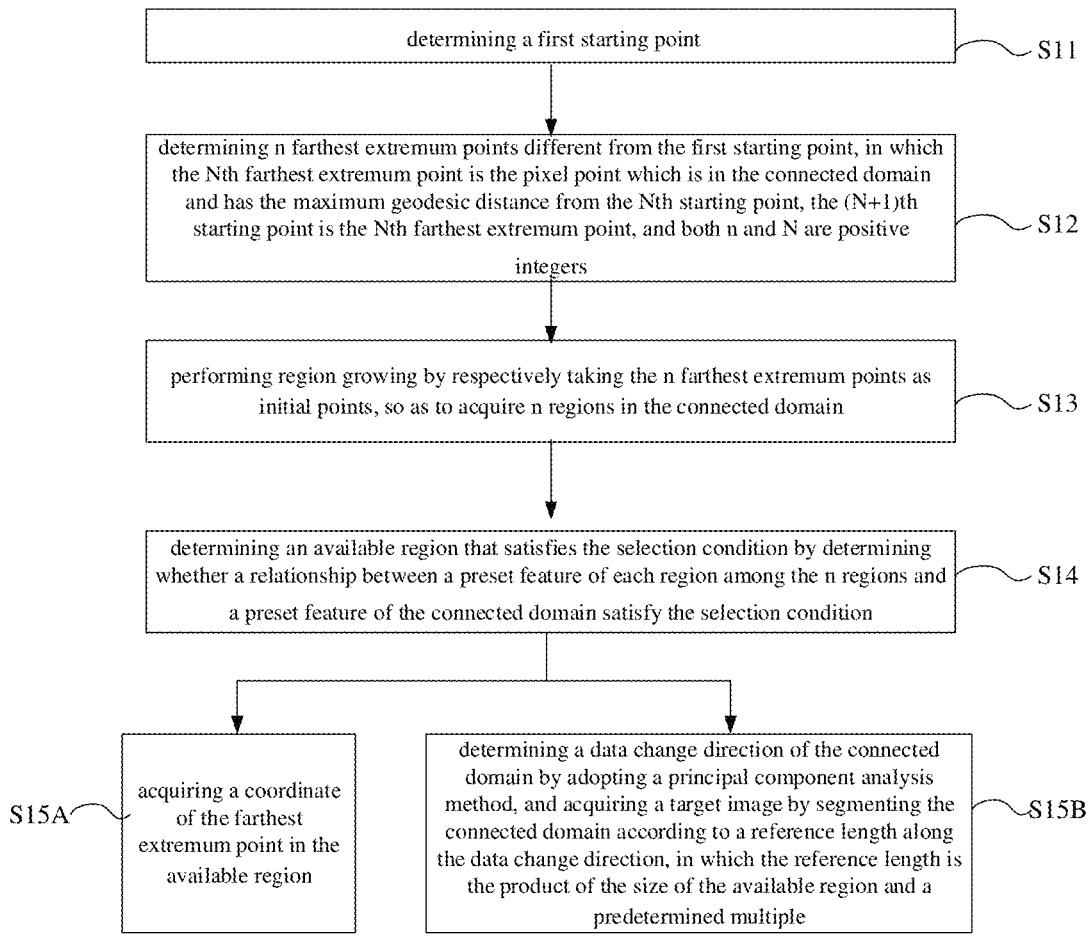
FIG. 1 is a flowchart of an image detection method provided by the embodiments of the present disclosure.

At least one embodiment of the present disclosure provides the image detection method. As shown in FIG. 1, the image detection method includes the following steps S11 to S14.

S11: determining the first starting point in the connected domain in the image to be detected.

For instance, the first starting point is determined according to the gravity center or the geometric center of the connected domain. For instance, a distance from an object point corresponding to the first starting point to an object point corresponding to one of the gravity center of the connected domain in the image to be detected and the geometric center of a circumscribed graph of the connected domain is smaller than 2 cm (centimeters). For instance, the first starting point is one of the gravity center of the connected domain in the image to be detected and the geometric center of the circumscribed graph of the connected domain, or the first starting point is a neighbor point of the gravity center, or the first starting point is a neighbor point of the geometric center.

Taking the case that the present application is used for hand detection as an example, the first starting point in the connected domain of the image to be detected is used for representing the position of the palm of the hand, and the first starting point is determined according to the gravity center or the geometric center of the connected domain, so that the first starting point will not be a point too close to the pixel point corresponding to the fingertip.

The connected domain is composed of a plurality of connected pixel points. For any pixel point in the connected domain, four pixel points which are respectively on the left side, the top side, the right side and the bottom side of the pixel point are called 4-neighbor points, and eight pixel points which are respectively on the left side, the top side, the right side, the bottom side, the upper left side, the upper right side, the lower right side and the lower left side of the pixel point are called 8-neighbor points. The pixel point is connected with any neighbor point.

Herein, the coordinate of the gravity center of the connected domain is the mean value of the coordinates of all the pixel points in the connected domain, that is, the X coordinate of the gravity center is the arithmetic mean value of the X coordinates of all the pixel points in the connected domain, and the Y coordinate of the gravity center is the arithmetic mean value of the Y coordinates of all the pixel points in the connected domain. Because the gravity center is not affected by the contour shape of the connected domain, the adoption of the gravity center as the first starting point can prevent the shape of the object corresponding to the connected domain from affecting the detection result.

For instance, the circumscribed graph of the connected domain may be a circumscribed rectangle or ellipse. For instance, the geometric center of the circumscribed graph can be determined according to the geometric shape of the circumscribed graphic.

S12: determining the n farthest extremum points different from the first starting point, in which the Nth farthest extremum point is the pixel point which is in the connected domain and has the maximum geodesic distance from the Nth starting point, the (N+1)th starting point is the Nth farthest extremum point, and both n and N are positive integers.

For instance, n may be 1, or n may be greater than or equal to 2.

For instance, in the situation where n is greater than or equal to 2, the n farthest extremum points are determined one after another. For instance, in the situation where n is greater than or equal to 2, the step S12 may include: calculating geodesic distances from the pixel points in the connected domain to the first starting point, and selecting the pixel point with the maximum geodesic distance as the first farthest extremum point; taking the first farthest extremum point as the second starting point, then calculating geodesic distances from the pixel points in the connected domain to the second starting point, and selecting another pixel point with the maximum geodesic distance as the second farthest extremum point; and so on.

Geodesic distance is an important concept in mathematical morphology to measure the distance between two points. Different from the Euclidean distance, the geodesic distance takes into account the connectivity of the region. There is at least one path in the connected domain to connect two points A and B; the shortest path in the at least one path is referred to as the geodesic arc between A and B; and the length of the geodesic arc is the geodesic distance. The geodesic distance utilizes the gradient of the graph, and the geodesic arc is obtained by connecting the two points along the maximum gradient direction.

S13: performing the region growing by respectively taking the n farthest extremum points as initial points, so as to acquire n regions in the connected domain.

For instance, a growth end point of each region can be determined by utilization of the morphological feature (e.g., contour shape or size) of the target object. Because the width of the hand changes significantly at the base of the finger, in the situation where the object corresponding to the connected domain includes the hand, the end point of region growing can be determined by utilization of this morphological feature. For instance, for each region among the n regions, the determination method of the growth end point of the region includes: after a certain growth of the region, for instance, after the ith growth (i is greater than or equal to 1), if the increased value of the number of pixel points in the (i+1)th growth of the region exceeds a preset value (the preset value may be set according to actual demands), the ith growth is the last growth of the region, and the position where the pixel points in the ith growth are located is the position of the end point of the region.

For instance, for each region among the n regions, the growth end point of the region may also be determined according to a preset length (the preset length may be set according to actual demands).

S14: determining the available region that satisfies the selection condition by determining whether a relationship between a preset feature of each region among the n regions and a preset feature of the connected domain satisfy the selection condition.

For instance, the preset feature of each region may be a size feature of the region, e.g., the length, width or area of the region. For instance, the area of the region may be represented by the number of pixel points in the region.

Similarly, the preset feature of the connected domain may be a size feature of the connected domain, for instance, the length, width or area of the connected domain. For instance, the area of the connected domain may be represented by the number of pixel points in the connected domain.

For instance, in the situation where the embodiment of the present disclosure is used for hand detection, the selection condition of the available region can be determined by utilization of the relationship between the size feature of the finger and the size feature of the hand. For instance, the selection condition of the available region includes at least one or more selected from (A), (B) and (C).

Condition (A): according to the feature that the ratio of the length of the finger to the width of the palm is not smaller than ⅓ and not greater than 1.5, the first ratio of the length of each region to the maximum width of the connected domain is not smaller than ⅓ and not greater than 1.5.

For instance, the length of each region is the number of pixel points in the direction from the initial point (namely the farthest extremum point in the region) of the region to the end point of the region.

Condition (B): according to the feature that the ratio of the width of the finger to the width of the palm is not greater than ⅕, the second ratio of the width of each region to the maximum width of the connected domain is not greater than ⅕.

For instance, the width of each region is the number of pixel points at the position of the growth end point of the region in the width direction of the region.

Condition (C): according to the feature that the ratio of the area of the finger to the area of the hand is not greater than ⅕, the third ratio of the area of each region to the area of the connected domain is not greater than ⅕.

For instance, the number of pixel points may be used to represent the area, and the ratio of the number of pixel points of each region to the number of pixel points of the connected domain is not greater than ⅕. For instance, the number of pixel points of each region can be obtained during the region growing. For instance, the number of pixel points of the connected domain can be obtained in the process of finding the farthest extremum points by calculating the geodesic distance.

For instance, as shown in FIG. 1, the image detection method provided by at least one embodiment of the present disclosure may further include the step S15A or the step S15B.

S15A: acquiring the coordinate of the farthest extremum point in the available region. For instance, in the situation where the embodiment of the present disclosure is used for hand detection, the coordinate of the farthest extremum point may be taken as the coordinate of the fingertip.

S15B: determining a data change direction of the connected domain by adopting a principal component analysis (PCA) method, and acquiring the target image by segmenting the connected domain according to a first reference length along the data change direction, in which the first reference length is the product of the size of the available region and a first predetermined multiple.

The PCA method is a multivariate statistical analysis method that transforms data into a new coordinate system by linear transformation, so that the variance of the data on the first coordinate axis can be maximum; the variance of the data on the second coordinate axis is the second largest; and so on. The direction of the first coordinate axis is the principal direction, that is, the principal direction is the direction in which the variance of the data is maximum, and the secondary direction is the direction in which the variance of the data is the second largest. Both the principal direction and the secondary direction are called the data change direction.

As for hand, the principal direction of the hand is the length direction (extension direction) of the hand, and the secondary direction of the hand is the width direction of the hand. Therefore, when the embodiment of the present disclosure is used for hand detection, for instance, the data change direction of the connected domain may be the principal direction of the connected domain, and the first reference length may be the product of the length of the available region and the first predetermined multiple. That is to say, when the embodiment of the present disclosure is used for hand detection, the connected domain is segmented according to the product of the length of the available region and the first predetermined multiple along the principal direction of the connected domain, so as to remove the region of the object, except the hand, in the connected domain, and then acquire a hand connected domain.

For instance, in the situation where the n regions include a plurality of available regions, the first reference length is the product of the size of the available region with the maximum length and the first predetermined multiple. Because the thumb extends substantially along the secondary direction of the hand and the remaining fingers extend substantially along the principal direction of the hand, the determination of the first reference length according to the available region with the maximum length can improve the accuracy of hand segmentation.

According to the feature that the length of the hand is about 1.5 times the length of the finger, for instance, the first predetermined multiple may be set to be 1.5-1.7. The first predetermined multiple is not smaller than 1.5, so as to avoid the case that the target image only includes a part but not all of the hand which is caused by the excessive segmentation of the connected domain.

For instance, the image to be detected in the embodiment of the present disclosure may not include depth information. The depth information refers to the distance from an object point corresponding to the pixel point in the image to a camera that captures the image. In the embodiments of the present disclosure, the growth end point of the suspected region can be determined according to the fact whether the number of pixel points is obviously increased, and the available region can be determined according to the relationship between the size feature of the suspected region and the size feature of the connected domain, so the depth information is not required to be used. Therefore, the embodiments of the present disclosure can be used for detecting the image captured by a common camera. The cameras include depth-sensing camera, stereo camera and common camera. Both the depth-sensing camera and the stereo camera can be utilized to acquire an image with depth information, and the common camera can be utilized to acquire an image without depth information. In other embodiments of the present disclosure, the image to be detected may also include the depth information, and in this case, the selection condition used for determining the available region may be set according to the depth information, or may also not involve the depth information.

Figure 2:
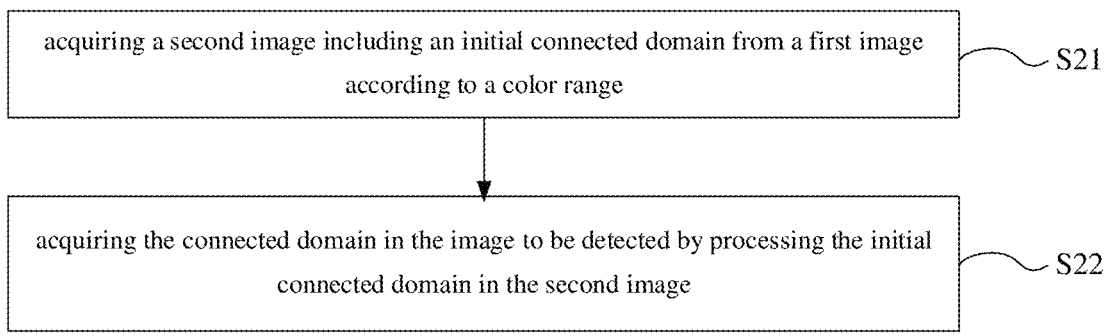
FIG. 2 is a flowchart illustrating the process of utilizing a first image to acquire an image to be detected in the image detection method provided by the embodiments of the present disclosure.

Because the image captured by the common camera does not include the depth information, in this case, in order to acquire the connected domain in the image to be detected, the image captured by the common camera can be processed according to a color range. For instance, as shown in FIG. 2, the image detection method provided by at least one embodiment of the present disclosure further includes the steps S21 and S22.

S21: acquiring a second image including an initial connected domain from a first image according to the color range.

For instance, the first image may be a color image. For instance, the first image may be a color image captured by the common camera, and in this case, the first image does not have depth information.

For instance, when the embodiment of the present disclosure is used for hand detection, the color range can be determined according to skin color, that is, the second image including the initial connected domain can be acquired from the first image according to the skin color, which is hereafter referred to as skin color detection, and the initial connected domain acquired through the skin color detection is hereafter referred to as a skin color connected domain.

S22: acquiring the connected domain in the image to be detected by processing the initial connected domain in the second image.

Partial interference can be eliminated by processing the initial connected domain, so as to obtain the connected domain in the image to be detected with less interference.

For instance, when the embodiment of the present disclosure is used for hand detection, an object corresponding to the initial connected domain acquired in the step S21 may include hand and arm; and in the step S22, the processing for the initial connected domain is, for instance, image segmentation processing, so as to remove the arm in the initial connected domain, which is hereafter referred to as arm removal processing.

Figure 3:
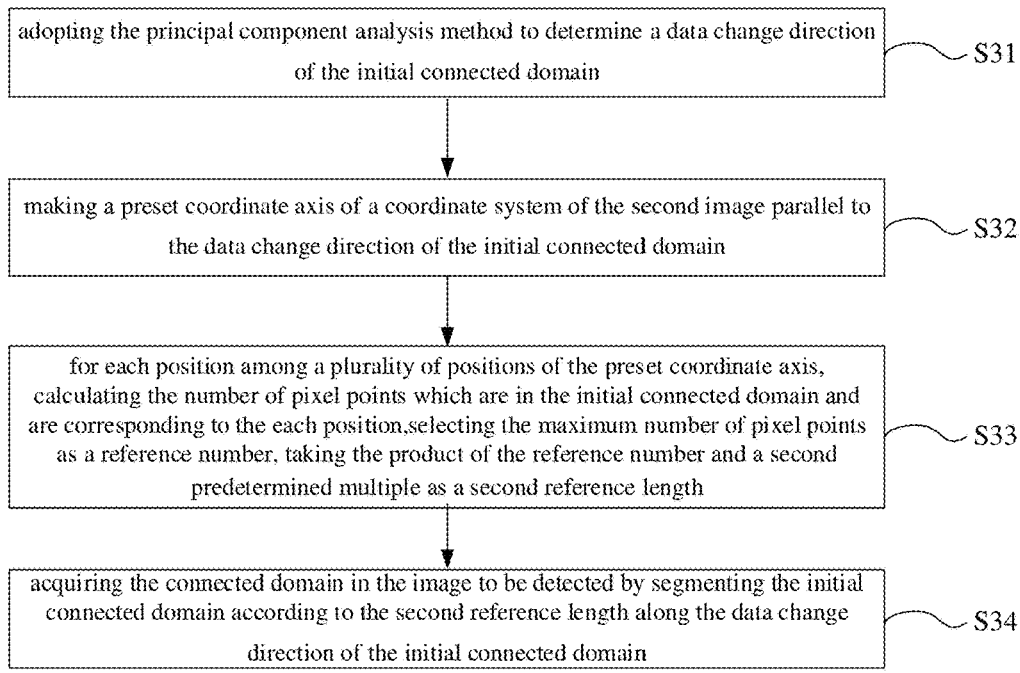
FIG. 3 is a flowchart illustrating the process of segmenting an initial connected domain in the image detection method provided by the embodiments of the present disclosure.

For instance, taking the case that the embodiment of the present disclosure is used for hand detection as an example, as shown in FIG. 3, the above step S22 may include the steps S31 to S34.

S31: adopting the PCA method to determine a data change direction of the initial connected domain.

For instance, for the hand, the data change direction of the initial connected domain may be the principal direction of the initial connected domain.

S32: making a preset coordinate axis of a coordinate system of the second image parallel to the data change direction of the initial connected domain.

For instance, the preset coordinate axis is Y axis. For instance, the Y axis of the coordinate system of the second image is parallel to the principal direction of the initial connected domain, and the X axis of the coordinate system of the second image is parallel to the secondary direction of the initial connected domain.

S33: for each position among a plurality of positions of the preset coordinate axis, calculating the number of pixel points which are in the initial connected domain and are corresponding to the each position.

For instance, in the situation where the preset coordinate axis is the Y axis, a distance between adjacent positions among the plurality of positions on the preset coordinate axis is the unit length of the Y axis.

For instance, starting from the vertex (the Y coordinate of the vertex is, for instance, K0) of the initial connected domain, the number of pixel points A1 at a position Y=K0−1, the number of pixel points at a position Y=K0−2, the number of pixel points A3 at a position Y=K0−3, and the like are calculated, until the numbers of pixel points corresponding to all the Y coordinates in the initial connected domain are calculated.

S34: selecting the maximum number of pixel points as a reference number, taking the product of the reference number and a second predetermined multiple as a second reference length, and acquiring the connected domain in the image to be detected by segmenting the initial connected domain according to the second reference length along the data change direction of the initial connected domain.

The maximum number of pixel points may be considered as the number of pixel points corresponding to the width of the palm, that is, the reference number reflects the width of the palm.

Because the length of the hand is about k (k is from 2.5 to 3.0) times the width of the palm, the length of the hand can be estimated according to k times of the reference number reflecting the width of the palm. In view of this, the above second predetermined multiple is, for instance, from 2.5 to 3.0, and the second reference length is used for representing the length of the hand. The initial connected domain is segmented according to the second reference length along the principal direction of the initial connected domain, so as to remove a region where the arm in the initial connected domain is located and obtain the suspected hand connected domain. The suspected hand connected domain may be taken as the connected domain in the image to be detected.

Figure 4:
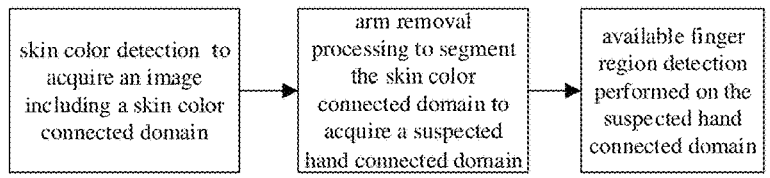
FIG. 4 is a flowchart when the image detection method provided by the embodiments of the present disclosure is used for hand detection.

In summary, as shown in FIG. 4, when the embodiment of the present disclosure is used for hand detection, the image detection method provided by the embodiment of the present disclosure sequentially includes three processes, namely the skin color detection, the arm removal processing and the available finger region detection. The skin color detection may be adopted to acquire an image (one example of the second image described above) including the skin color connected domain; the arm removal processing is used to segment the skin color connected domain to acquire the image (one example of the image to be detected described above) including the suspected hand connected domain; and the available finger region detection (may also be referred to as available fingertip detection) is to detect whether there is the available finger region satisfying the finger selection condition in the suspected hand connected domain. For each frame of image inputted by the camera, the above three processes can be sequentially executed to acquire the available finger region; and fingertip information may be acquired according to the available finger region, or hand segmentation is performed and subsequently, the result of the hand segmentation may be inputted into a classifier for recognition.

The classifier, for instance, is a trained neutral network. The neutral network is, for instance, a convolutional neural network. This may refer to the known classifier. No further description will be given here.

Detailed description will be given below to one example of the image detection method by taking the case that the embodiment of the present disclosure is used for hand segmentation as an example.

Figure 5:
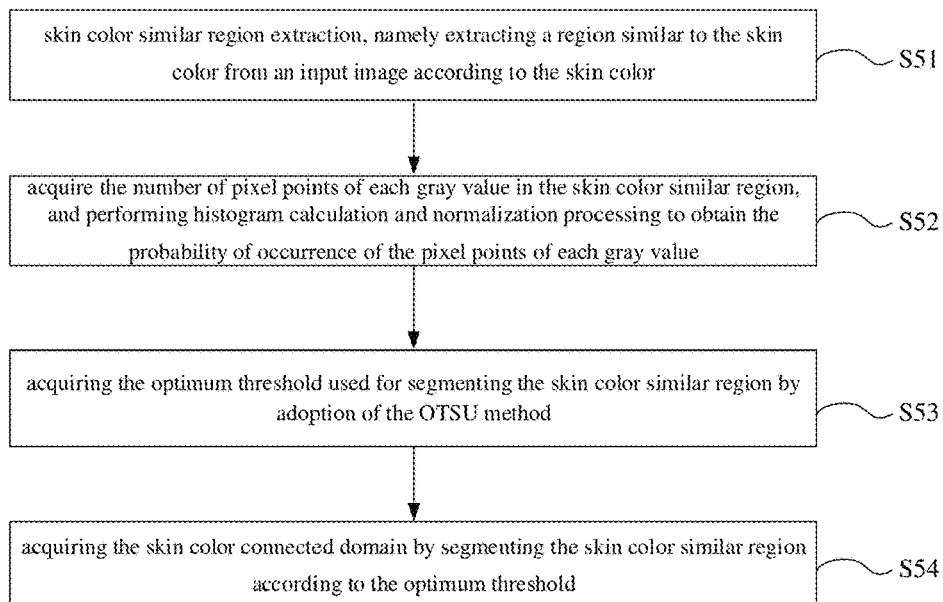
FIG. 5 is a flowchart illustrating skin color detection in the image detection method provided by the embodiments of the present disclosure.

For instance, as shown in FIG. 5, the skin color detection process includes the steps S51 to S54.

S51: skin color similar region extraction, namely extracting a region similar to the skin color (skin color similar region for short) from an input image according to the skin color.

As for the input image, for instance, the RGB color space of the input image can be converted into the YCrCb color space, because the YCrCb color space is less affected by the brightness and the skin color will be well gathered; subsequently, for instance, as for yellow people and white people, a region with the Cr value of 133-173 and the Cb value of 77-127 can be extracted as the skin color similar region. In other examples of the present disclosure, the RGB color space may also be directly adopted for processing, or the RGB color space is converted into other available color spaces for processing.

S52: utilizing a histogram to acquire the number of pixel points of each gray value in the skin color similar region, and subsequently performing normalization processing to obtain the probability of occurrence of the pixel points of each gray value.

For instance, a Cr image is extracted from the image processed by the step S51, so as to obtain a new single-channel image with a grayscale range of 0-40; the new single-channel image is converted into a grayscale image; and histogram calculation and normalization processing are performed to obtain the probability, in the grayscale image, of occurrence of the pixel points of each gray value within the grayscale range of 0-40, and the probability can be expressed as follows: supposing that there are m pixel points with the same gray value in the grayscale image, and the total number of pixel points in the grayscale image is M, the probability of occurrence of the pixel points of this gray value is $Pi=m/M$.

S53: acquiring the optimum threshold used for segmenting the skin color similar region by adoption of the OTSU method and by utilization of the probability obtained in the step S52.

In this step, the inter-class variance between the foreground (Class A) and the background (Class B) of the grayscale image is calculated, and the inter-class variance obtained from the optimum threshold is maximum, namely the threshold in the case of the maximum inter-class variance is the optimum threshold of the grayscale image.

S54: acquiring the skin color connected domain by segmenting the skin color similar region according to the optimum threshold.

After the skin color detection, one or more connected domains may be retained in the image. The retained connected domain may be the human face, the human hand or an irrelevant object with close color. And then the arm removal processing can be utilized to process each retained connected domain to obtain the suspected hand connected domain.

Figure 6:
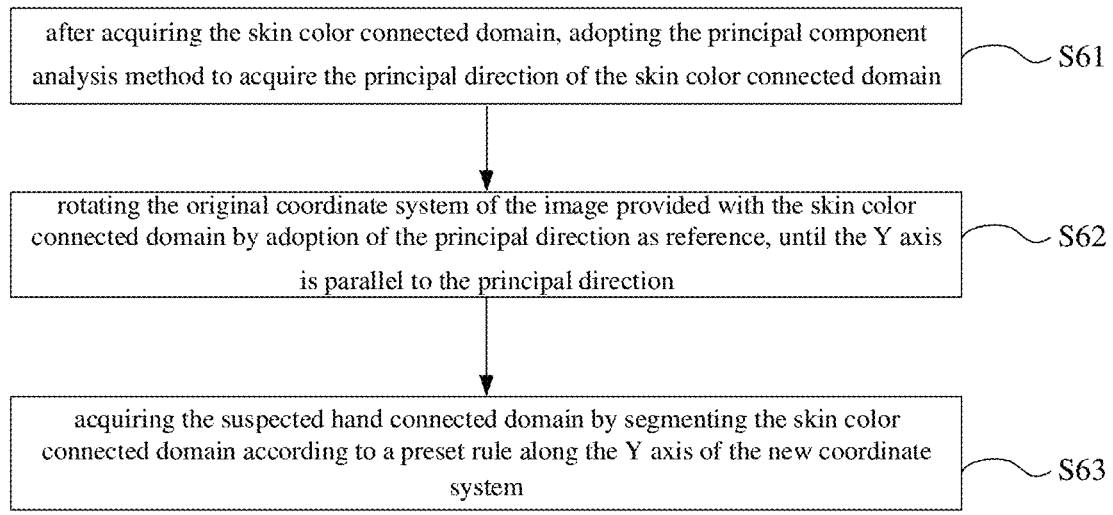
FIG. 6 is a flowchart illustrating arm removal processing in the image detection method provided by the embodiments of the present disclosure.

For instance, as shown in FIG. 6, the arm removal processing includes the following steps S61 to S63.

S61: after acquiring the skin color connected domain, adopting the PCA method to acquire the principal direction of the skin color connected domain. For instance, the principal direction is shown by the white straight line in FIG. 7(A).

Figure 7:
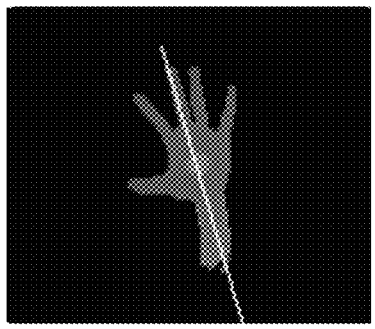
FIGS. 7(A) to 7(D) are processing effect diagrams obtained after the steps of arm removal processing in the image detection method provided by the embodiments of the present disclosure.
Figure 7:
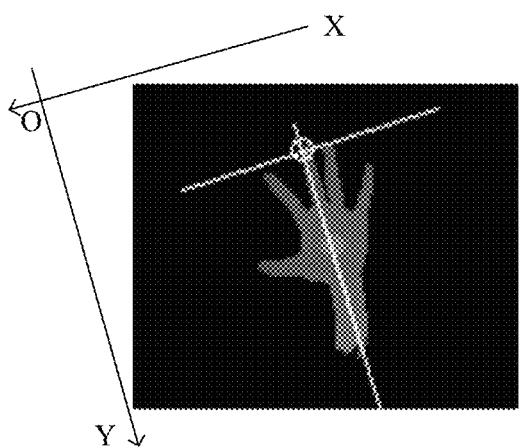
Figure 7:
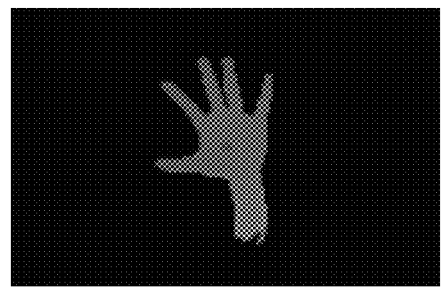
Figure 7:
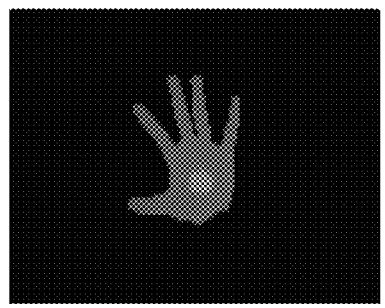

S62: rotating the original coordinate system of the image provided with the skin color connected domain by adoption of the principal direction as reference, until the Y axis is parallel to the principal direction. The new coordinate system XOY after rotation is as shown in FIG. 7(B).

By the step S62, the coordinates of all the points in the image before the rotation of the coordinate system are given new coordinate values in the new coordinate system.

For instance, the vertex (as shown by a point marked by a circle) of the skin color connected domain may be a point with the maximum Y value (namely Y coordinate value).

S63: acquiring the suspected hand connected domain by segmenting the skin color connected domain according to a preset rule along the Y axis of the new coordinate system. For instance, the suspected hand connected domain is as shown in FIG. 7(C) and FIG. 7(D).

For instance, in this step, based on the new coordinate system, starting from the point with the largest Y value, the numbers of pixel points corresponding to all the Y values in the skin color connected domain are calculated along the direction (as indicated by the direction of the arrow) in which the Y values decrease, the position with the maximum number of pixel points may be considered as the position of the palm, and the maximum number of pixel points (one example of the reference number described above) may be taken as the maximum width W of the hand; k (for instance, k is 2.5-3.0) times of the maximum number of pixel points is taken as the length L of the hand, segmentation is performed according to the length L along the principal direction starting from the vertex of the skin color connected domain, the part below a segmented position is all considered the arm and removed, and then the image including the suspected hand connected domain is obtained.

The value of k is such that the suspected hand connected domain may still have a long residual part of the arm (as shown in FIG. 7(C)), or may also include all of the hand but does not include the arm (as shown in FIG. 7(D)). Even so, the value of k in the arm removal processing can be slightly large but not too small, because too small k may cause the excessive segmentation phenomenon that a part of the hand is segmented.

In FIGS. 7(A) to 7(C), the width of the skin color connected domain is maximum at the position of the palm. In some other embodiments, if the color of the clothes is close to the skin color, the width of the arm may be larger than the width of the palm. In this case, because the value of k is 2.5-3.0, the value can still realize the case of taking the k times of the maximum width (for instance, the maximum number of pixel points) of the skin color connected domain as the length L of the hand.

After acquiring the suspected hand connected domain, the available finger region detection is performed. If at least one available finger region is detected to exist, the available finger region may be utilized for subsequent processing; and if no available finger region is detected, the next skin color connected domain may be subjected to the arm removal processing and the available finger region detection continuously.

Figure 8:
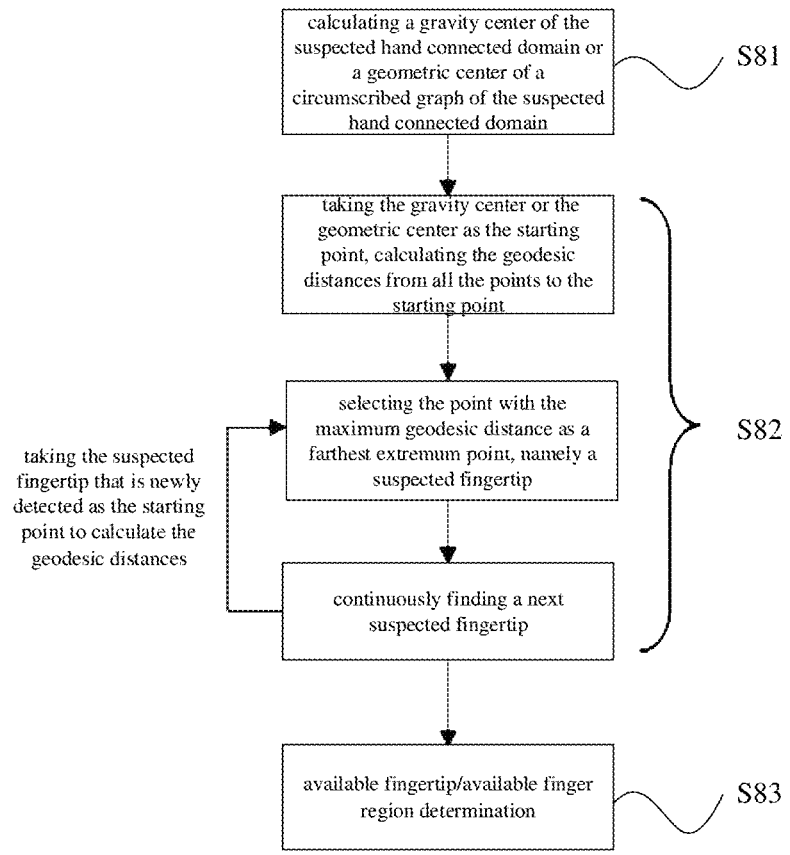
FIG. 8 is a flowchart illustrating the process of determining an available finger region in the image detection method provided by the embodiments of the present disclosure.

The available finger region detection may be as shown in FIG. 8 and includes the steps S81 to S83.

S81: calculating the gravity center of the suspected hand connected domain or the geometric center of the circumscribed graph (e.g., rectangle or ellipse) of the connected domain, obtained in the step S63.

S82: taking the gravity center or the geometric center obtained in the step S81 as the first starting point, calculating the geodesic distances from all the points in the connected domain to the first starting point, and selecting the point with the maximum geodesic distance as the first farthest extremum point, namely the first suspected fingertip; after finding one farthest extremum point each time, taking this farthest extremum point as the starting point, and continuously finding the next farthest extremum point until the n farthest extremum points (for instance, n>5; for instance, 5<n≤10) are obtained; and taking these farthest extremum points as suspected fingertips.

For instance, the first farthest extremum point may be obtained according to the following steps S821 to S823.

S821: initializing a distance matrix.

One distance matrix having the same size with the image obtained in the step S63 is formed by initialization, and elements in the distance matrix are in one-to-one correspondence with the pixel points in the image. For instance, a distance value of a point which is in the distance matrix and is corresponding to the starting point (the first starting point is the gravity center or the geometric center of the suspected hand connected domain obtained in the step S81) is set to be 0; distance values of points which are in the distance matrix and are corresponding to other points in the suspected hand connected domain are set to be a certain maximum (for instance, 100,000 or other values); and distance values of points which are in the distance matrix and are corresponding to background points (namely points outside the suspected hand connected domain) in the image are set to be −1, which indicates that the distance values of these points are not calculated.

S822: updating the distance matrix.

The distance matrix is gradually updated starting from the starting point, and the starting point is placed in a first input first output (FIFO) queue at first. One point is taken out from the FIFO queue each time; this point is taken as a base point; whether distance values corresponding to 8-neighbor points of the base point need to be updated is detected; and if a new distance value of each neighbor point among the 8-neighbor points is smaller than an original distance value of the neighbor point, the distance value of the neighbor point among the 8-neighbor points is updated, and the neighbor point that is updated is added into the FIFO queue. Subsequently, the neighbor point that is updated is taken out from the FIFO queue and taken as another base point to calculate the new distance values of the 8-neighbor points of the another base point. As for the 8-neighbor points of each base point, the new distance value of each neighbor point is the distance value of the base point plus a two-dimensional distance from the base point to the neighbor point. For instance, the new distance values of 4-neighbor points of the base point is the distance value of the base point plus 1, and the new distance values of diagonal-neighbor points of the base point are the distance value of the base point plus the positive square root of 2 (1.414). Because the same point may be the neighbor point of a plurality of base points, in this case, the minimum distance among the distance values obtained by calculation according to the plurality of base points is selected as the new distance value of this point. In the situation where all the points in the FIFO queue are processed, the updating of the distance matrix is finished.

S823: selecting the farthest extremum point.

The distance values greater than 0 in the updated distance matrix are the geodesic distances from the points in the suspected hand connected domain to the starting point, and the point with the maximum distance value in the updated distance matrix is found and taken as the farthest extremum point.

The steps S821 to S823 are repeatedly executed until the n farthest extremum points are detected. These farthest extremum points are suspected fingertips, namely candidate points of the fingertip.

For instance, as shown in (A) of FIG. 9, the first farthest extremum point (as shown by a white dot) is disposed at the fingertip of the middle finger; as shown in (B) of FIG. 9, the second farthest extremum point is disposed at the fingertip of the ring finger; as shown in (C) of FIG. 9, the third farthest extremum point is disposed at the fingertip of the forefinger; as shown in (D) of FIG. 9, the fourth farthest extremum point is disposed at the fingertip of the little finger; and as shown in (E) of FIG. 9, the fifth farthest extremum point is disposed at the fingertip of the thumb.

S83: obtaining the available finger region by performing the available fingertip detection on all the suspected fingertips.

For instance, each farthest extremum point is taken as the starting point, and the pixel growth method is adopted to examine whether the region where the farthest extremum point is located is the available finger region.

As shown in FIG. 10, the growth of the suspected finger region is performed by taking the farthest extremum point as the starting point; in each growth, each pixel only grows once towards a neighbor pixel (namely the points in each growth is neighbor pixel points in a previous growth); and white marks in the figures are respectively positions of new pixels in a plurality of times of growth. When the total number of pixels grown in a certain region meets a proper ratio of the number of pixels of the finger to the number of pixels of the hand, the region may be considered as the finger region. For instance, as shown by the last growth in FIG. 10, the number of pixels will be in sharp rise in the case of continuous growth; at this point, growth is stopped; the position where the last growth occurs is a critical position; the distance from the critical position to the initial point of growth is the length of the suspected finger region; and only when this length satisfies the preset proportional relationships (for instance, the selection condition of the above available finger region) with the width, the area and the like of the hand, the suspected finger region can be determined as the available finger region.

For instance, the preset proportional relationships include the following three relationships.

1. The length of the suspected finger region is not smaller than ⅓ of the maximum width W of the suspected hand connected domain calculated in the step S63 and not greater than 1.5 times of the maximum width W of the suspected hand connected domain.

For instance, the length of the suspected finger region is the number of pixel points in the direction from the initial point of the region to the end point of the region, and can be known during the region growing.

2. The width of the suspected finger region is not greater than ⅓ of the maximum width W of the suspected hand connected domain.

For instance, the width of the suspected finger region is the number of pixel points at the position of the growth end point in the width direction of the finger, and can be known during the region growing.

3. The area of the suspected finger region (for instance, the total number of pixel points, which can be obtained during the region growing) is not greater than ⅕ of the area of the entire suspected hand connected domain (for instance, the total number of pixel points, which can be obtained in the process of calculating the geodesic distances).

For instance, at least one or the combination of the above three determination conditions can be adopted. In the situation where the three determination conditions are simultaneously adopted to determine the suspended finger regions one by one, all the available finger regions can be more accurately selected. In the situation where at least one available finger region is found, the suspected hand connected domain is the available hand connected domain, and subsequently, the available hand connected domain can be directly sent into the classifier, or be further segmented and then sent into the classifier for gesture recognition; and as for non-hand objects mentioned above such as the human face or other interferents, because the shapes, the sizes and the like thereof do not meet the proportional relationships between the finger and the hand, no available finger region can be detected, so it can be determined that they are not the available hand connected domain.

After all the available finger regions are detected, the length of the longest available finger region is selected, and according to 1.5-1.7 times of this length and the information of the principal direction determined in the previous steps, the suspected hand connected domain is segmented along the Y axis parallel to the principal direction. As shown in (A) and (B) of FIG. 11, (A) in FIG. 11 shows the connected domain before segmentation, and (B) in FIG. 11 is the connected domain after segmentation.

For instance, as shown in (A) and (B) in FIG. 12, a hand image with good effect can be obtained by adoption of the method provided by the embodiments of the present disclosure; and because an embodiment of the present disclosure adopts the skin color detection, the hand in the obtained hand image may also include handprint.

Because the skin color detection result may be affected by the factors such as exposure and close color of object, in order to acquire more accurate hand connected domain, after the target image is obtained by segmenting the available hand connected domain according to the available finger region, the target image can be subjected to skin color extraction again (the method refers to the skin color detection processing). Because this extraction is performed within one small range of one picture, this range includes less information and most of the pixels are hand information, so the method of enhancing the contrast (for instance, histogram equalization) can be adopted to improve the effect of hand segmentation. After secondary skin color segmentation, good hand segmentation effect can be obtained and then sent into the classifier for gesture recognition.

At least one embodiment of the present disclosure further provides an image detector system. As shown in FIG. 13, the image detector system includes a point determiner device, a region determiner device connected with the point determiner device, and a judge device connected with the region determiner device.

The point determiner device is configured to: determine the first starting point and n farthest extremum points different from the first starting point; the first starting point is one of the gravity center of the connected domain in the image to be detected and the geometric center of the circumscribed graph of the connected domain; the (N+1)th starting point is the Nth farthest extremum point; the Nth farthest extremum point is the pixel point which is in the connected domain and has the maximum geodesic distance from the Nth starting point; and both n and N are positive integers.

The region determiner device is configured to: acquire the n regions in the connected domain by performing the region growing by respectively taking the n farthest extremum points as the initial points.

The judge device is configured to: determine the available region that satisfies the selection condition by determining whether the relationship between the preset feature of each region among the n regions and the preset feature of the connected domain satisfy the selection condition.

For instance, the image detector system further includes an extractor device which is configured to: acquire the coordinate of the farthest extremum point in the available region; or adopt the PCA method to determine the data change direction of the connected domain, and acquire the target image by segmenting the connected domain according to the reference length (namely the above first reference length) along the data change direction, in which the reference length is the product of the size of the available region and the predetermined multiple (namely the above first predetermined multiple).

For instance, the image detector system may further include the camera which is configured to acquire the image and input the image acquired into the point determiner device. The camera may be the common camera, and the image captured is a two-dimensional image and does not include depth information.

The functions of the devices in the image detector system provided by the embodiments of the present disclosure may refer to relevant descriptions in the embodiments of the foregoing image detection method.

For instance, the specific structures of the point determiner device, the region determiner device, the judge device and the extractor device in the image detector system can all be implemented by hardware, software or firmware, for instance, corresponding to a processor and executable instructions capable of being executed by the processor. For instance, the processor may be a central processing unit (CPU), a micro controller unit (MCU), a digital signal processor (DSP), a programmable logic controller (PLC) or other electronic components with processing function or a collection of the electronic components.

In addition, the above devices in the embodiments of the present disclosure can be all implemented by one processor or respectively implemented by different processors, or any two or more than two devices are implemented in one processor; and the above devices may be implemented by hardware or may also be implemented in the form of hardware plus software functional units.

At least one embodiment of the present disclosure further provides another image detector system. As shown in FIG. 14, the image detector system includes a processor, a memory, and computer program instructions stored in the memory, and the computer program instructions are executed by the processor to perform: determining the first starting point which is one of the gravity center of the connected domain in the image to be detected and the geometric center of the circumscribed graph of the connected domain; determining n farthest extremum points different from the first starting point, in which the Nth farthest extremum point is the pixel point which is in the connected domain and has the maximum geodesic distance from the Nth starting point, the (N+1)th starting point is the Nth farthest extremum point, and both n and N are positive integers; performing the region growing by respectively taking the n farthest extremum points as the initial points, so as to acquire the n regions in the connected domain; and determining the available region that satisfies the selection condition by determining whether the relationship between the preset feature of each region among the n regions and the preset feature of the connected domain satisfy the selection condition.

The memory may include at least one of a read-only memory or a random-access memory and provides instructions and data to the processor. A part of the memory may further include a non-volatile random-access memory (NVRAM) and includes a magnetic memory, a semiconductor memory, or an optical memory, etc.

The processor may be a general-purpose processor (for instance, a central processing unit), a digital signal processor, an application-specific integrated circuit (ASIC), a field programmable gate array (FPGA), other programmable logic devices, a transistor logic device or a discrete hardware component. The general-purpose processor may be a micro controller unit or any conventional processor.

At least one embodiment of the present disclosure further provides a storage medium, and computer program instructions are stored in the storage medium and applicable to be loaded by the processor to perform the following operations: determining the first starting point which is one of the gravity center of the connected domain in the image to be detected and the geometric center of the circumscribed graph of the connected domain; determining the n farthest extremum points different from the first starting point, in which the Nth farthest extremum point is the pixel point which is in the connected domain and has the maximum geodesic distance from the Nth starting point, the (N+1)th starting point is the Nth farthest extremum point, and both n and N are positive integers; performing the region growing by respectively taking the n farthest extremum points as the initial points, so as to acquire the n regions in the connected domain; and determining the available region that satisfies the selection condition by determining whether the relationship between the preset feature of each region among the n regions and the preset feature of the connected domain satisfy the selection condition.

For instance, the storage medium may be a semiconductor memory, a magnetic surface memory, a laser memory, a random-access memory, a read-only memory, a serial access memory, a non-permanent memory, a permanent memory or a storage medium in any other form known in the art.

For instance, the processor may be a general-purpose processor, a digital signal processor, an application-specific integrated circuit, a field programmable gate array, other programmable logic devices, a transistor logic device or a discrete hardware component. The general-purpose processor may be a micro controller unit or any conventional processor.

At least one embodiment of the present disclosure further provides a device, which includes the image detector system or the storage medium provided by any foregoing embodiment.

For instance, the device can be AR smart glasses, a display or other human-computer interaction devices. The device acquires an image by utilization of a common camera, and realizes human-computer interaction by analysis and processing of the image.

At least one embodiment of the present disclosure further provides a hand detection method. As shown in FIG. 15, the hand detection method includes: determining the position of the palm of the hand in the connected domain in the image to be detected; determining the n farthest extremum points different from the position of the palm of the hand by taking the position of the palm of the hand as the first starting point, in which the Nth farthest extremum point is the pixel point which is in the connected domain and has the maximum geodesic distance from the Nth starting point, the (N+1)th starting point is the Nth farthest extremum point, and both n and N are positive integers; performing the region growing by respectively taking the n farthest extremum points as the initial points, so as to acquire the n regions in the connected domain; and determining the available finger region that satisfies the selection condition by determining whether the relationship between the preset feature of each region among the n regions and the preset feature of the connected domain satisfy the selection condition.

For instance, the position of the palm of the hand can be the gravity center of the connected domain in the image to be detected or the geometric center of the circumscribed graph (e.g., rectangle or ellipse). In other embodiments of the present disclosure, the position of the palm of the hand may also be determined by other means.

At least one embodiment of the present disclosure further provides a hand segmentation method. As shown in FIG. 16, the hand segmentation method includes the steps S161 to S163.

S161: acquiring the skin color connected domain by the skin color detection.

For instance, the skin color detection may refer to the above steps S51-S54.

S162: acquiring the maximum width of the skin color connected domain and the principal direction based on the PCA method, and segmenting the skin color connected domain according to the predetermined multiple of the maximum width along the principal direction, so as to acquire the suspected hand connected domain.

For instance, the step S162 may include the above steps S61-S63, so that the interference of the arm and the like can be removed. In this case, the maximum width of the skin color connected domain is, for instance, represented by the number of pixel points at the widest position of the skin color connected domain; the predetermined multiple is, for instance, the above k times, namely from 2.5 to 3.0; and the principal direction based on the PCA method is the principal direction of the skin color connected domain acquired by utilization of the PCA method.

S163: determining whether the suspected hand connected domain (one example of the connected domain in the image to be detected in the hand detection method) includes the available finger region by using the foregoing hand detection method.

In the step S163, if it is determined that the suspected hand connected domain includes at least one available finger region, it can be determined that the suspected hand connected domain is the available hand connected domain. For instance, the available hand connected domain can also be segmented along the principal direction according to the product of the length of the available finger region (for instance, the length of the longest available finger region) and the predetermined multiple (e.g., 1.5-1.7), so as to further eliminate the interference of the arm.

The embodiments of the foregoing hand detection method, hand segmentation method, image detection method, image detector system and device including the same may can be referred to each other. In addition, the embodiments of the present disclosure and the features in the embodiments may be combined without conflict.

In the embodiments of the present disclosure, the process of obtaining the suspected region by means of the region growing can avoid the interference of the region which is in the image to be detected, is connected with the connected domain of the target object but is actually corresponding to the interferent; the process of determining the available region by detecting the suspected region according to the preset selection condition can further reduce the interference factor of image detection; because the selection condition is determined according to the size feature of the suspected region and the size of the connected domain without the need of using the depth information, the embodiments of the present disclosure can be used for processing the image acquired by the common camera; by acquisition of the skin color connected domain by the skin color detection, the embodiments of the present disclosure can further remove partial interferents; and interference factors can be further removed by the arm removal processing. Therefore, the image detection technology provided by the embodiments of the present disclosure can be used for processing the image acquired by the common camera, can effectively reduce the interference factors, improve the accuracy of image detection result, and realize rapid real-time calculation.

What are described above is related to the illustrative embodiments of the disclosure only and not limitative to the scope of the disclosure; the scopes of the disclosure are defined by the accompanying claims.

What is claimed is:

1. An image detection method, comprising:
   determining a first starting point in a connected domain in an image to be detected;
   determining n farthest extremum points that are different from the first starting point and are in the connected domain in the image to be detected, wherein an Nth farthest extremum point among the n farthest extremum points is a pixel point which is in the connected domain and which has a maximum geodesic distance from an Nth starting point, an (N+1)th starting point is the Nth farthest extremum point, both n and N are positive integers, and N≤n;
   performing region growing by respectively taking the n farthest extremum points as initial points, so as to acquire n regions in the connected domain; and
   determining an available region that satisfies a selection condition by determining whether a relationship between a preset feature of each region among the n regions and a preset feature of the connected domain satisfy the selection condition.

2. The method according to claim 1, wherein a distance from an object point corresponding to the first starting point to an object point corresponding to one of a gravity center of the connected domain in the image to be detected and a geometric center of a circumscribed graph of the connected domain is smaller than 2 centimeters.

3. The method according to claim 1, further comprising: acquiring a coordinate of the farthest extremum point that is comprised by the available region.

4. The method according to claim 1, further comprising: determining a data change direction of the connected domain by a principal component analysis method, and acquiring a target image by segmenting the connected domain according to a first reference length along the data change direction, wherein the first reference length is the product of a first predetermined multiple and a size of the available region.

5. The method according to claim 4, wherein the data change direction of the connected domain is a principal direction of the connected domain.

6. The method according to claim 4, wherein the method is used for hand detection.

7. The method according to claim 6, wherein the first predetermined multiple is 1.5 to 1.7.

8. The method according to claim 6, wherein in a situation where the n regions comprise a plurality of available regions, the first reference length is the product of the first predetermined multiple and a size of the available region with a maximum length among the plurality of available regions.

9. The method according to claim 6, wherein the selection condition of the available region comprises at least one of A, B or C:
   A: a first ratio of a length of each region to a maximum width of the connected domain is not smaller than $\frac{1}{3}$ and not greater than 1.5;
   B: a second ratio of a width of each region to a maximum width of the connected domain is not greater than $\frac{1}{5}$; and
   C: a third ratio of an area of each region to an area of the connected domain is not greater than $\frac{1}{5}$.

10. The method according to claim 1, before the determining the first starting point, further comprising:
    acquiring a second image that comprises an initial connected domain from a first image according to a color range; and
    acquiring the connected domain in the image to be detected by processing the initial connected domain of the second image.

11. The method according to claim 10, wherein the method is used for hand detection, and the acquiring the connected domain by processing the initial connected domain comprises:
    adopting a principal component analysis method to determine a data change direction of the initial connected domain;
    making a preset coordinate axis of a coordinate system of the second image parallel to the data change direction of the initial connected domain;
    for each position among a plurality of positions of the preset coordinate axis, calculating the number of pixel points that are corresponding to each position and are in the initial connected domain; selecting the number of the pixel points that is maximum to serve as a reference number, and taking the product of the reference number and a second predetermined multiple as a second reference length; and
    acquiring the connected domain in the image to be detected by segmenting the initial connected domain according to the second reference length along the data change direction of the initial connected domain.

12. The method according to claim 11, wherein the second predetermined multiple is greater than or equal to 2.5 and smaller than or equal to 3.

13. The method according to claim 1, wherein for each region among the n regions, a determination method of a growth end point of the region comprises: after the ith growth of the region, in a situation where an increased value of the number of pixel points in the (i+1)th growth of the region exceeds a preset value, the ith growth is the last growth of the region.

14. The method according to claim 1, wherein for each region among the n regions, a growth end point of the region is determined according to a preset length.

15. The method according to claim 1, wherein the image to be detected is an image that does not comprise depth information of pixel points.

16. An image detector system, comprising a processor, a memory and computer program instructions stored in the memory, wherein the computer program instructions are executed by the processor to perform:
- determining a first starting point in a connected domain in an image to be detected;
- determining n farthest extremum points that are different from the first starting point and are in the connected domain in the image to be detected, wherein an Nth farthest extremum point among the n farthest extremum points is a pixel point which is in the connected domain and which has a maximum geodesic distance from an Nth starting point, an (N+1)th starting point is the Nth farthest extremum point, both n and N are positive integers, and N≤n;
- performing region growing by respectively taking the n farthest extremum points as initial points, so as to acquire n regions in the connected domain; and
- determining an available region that satisfies a selection condition by determining whether a relationship between a preset feature of each region among the n regions and a preset feature of the connected domain satisfy the selection condition.

17. A non-transitory computer readable medium, wherein computer program instructions are stored in the non-transitory computer readable medium and applicable to be loaded by a processor to execute following operations:
- determining a first starting point in a connected domain in an image to be detected;
- determining n farthest extremum points that are different from the first starting point and are in the connected domain in the image to be detected, wherein an Nth farthest extremum point among the n farthest extremum points is a pixel point which is in the connected domain and which has a maximum geodesic distance from an Nth starting point, an (N+1)th starting point is the Nth farthest extremum point, both n and N are positive integers, and N≤n;
- performing region growing by respectively taking the n farthest extremum points as initial points, so as to acquire n regions in the connected domain; and
- determining an available region that satisfies a selection condition by determining whether a relationship between a preset feature of each region among the n regions and a preset feature of the connected domain satisfy the selection condition.

18. A device, comprising the image detector system according to claim 16.

19. A hand detection method using the image detection method according to claim 1, comprising:
- determining a position of a palm of a hand in the connected domain in the image to be detected, and taking the position of the palm of the hand as the first starting point; and
- determining an available finger region that satisfies the selection condition by determining whether the relationship between the preset feature of each region among the n regions and the preset feature of the connected domain satisfy the selection condition.

20. A hand segmentation method, comprising:
- acquiring a skin color connected domain by skin color detection;
- acquiring both a principal direction based on a principal component analysis method and a maximum width of the skin color connected domain, and acquiring a suspected hand connected domain by segmenting the skin color connected domain according to a predetermined multiple of the maximum width along the principal direction; and
- determining whether the suspected hand connected domain comprises the available finger region by the method according to claim 19.

* * * * *